(12) United States Patent
Gaydarov

(10) Patent No.: US 11,518,024 B2
(45) Date of Patent: Dec. 6, 2022

(54) EXTENSIBLE UNDERCONSTRAINED ROBOTIC MOTION PLANNING

(71) Applicant: Intrinsic Innovation LLC, Mountain View, CA (US)

(72) Inventor: Stoyan Gaydarov, Burlingame, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 117 days.

(21) Appl. No.: 17/172,592

(22) Filed: Feb. 10, 2021

(65) Prior Publication Data

US 2022/0250240 A1    Aug. 11, 2022

(51) Int. Cl.
*B25J 9/00*    (2006.01)
*B25J 9/16*    (2006.01)
*B25J 9/06*    (2006.01)

(52) U.S. Cl.
CPC ........... *B25J 9/1612* (2013.01); *B25J 9/0045* (2013.01); *B25J 9/065* (2013.01); *B25J 9/1633* (2013.01)

(58) Field of Classification Search
CPC ........ B25J 9/1612; B25J 9/0045; B25J 9/065; B25J 9/1633
See application file for complete search history.

(56) References Cited

U.S. PATENT DOCUMENTS

| | | | |
|---|---|---|---|
| 5,347,459 A | 9/1994 | Greenspan et al. | |
| 5,434,489 A * | 7/1995 | Cheng | G05B 19/4182 |
| | | | 318/568.15 |
| 5,452,238 A | 9/1995 | Kramer et al. | |
| 5,499,320 A | 3/1996 | Backes et al. | |
| 6,004,016 A | 12/1999 | Spector | |
| 6,292,715 B1 | 9/2001 | Rongo | |
| 6,370,573 B1 | 4/2002 | Owman-Amuah | |

(Continued)

FOREIGN PATENT DOCUMENTS

KR    1020170050166    5/2017

OTHER PUBLICATIONS

Araujo et al. "Hierarchical Scheduling of Robotic Assembly Operations in a Flexible Manufacturing System," Fifth International FAIM Conference, Jun. 1995, 12 pages.

(Continued)

*Primary Examiner* — Ian Jen
(74) *Attorney, Agent, or Firm* — Fish & Richardson P.C.

(57) ABSTRACT

Methods, systems, and apparatus, including computer programs encoded on computer storage media, for generating motions for components in a robotic operating environment. One of the methods includes receiving a request to generate a motion for a kinematic system having a plurality of connected entities. An entity-specific sampling module for each of multiple degree-of-freedom (DOF) groups representing respective entities of the kinematic system is identified. A plurality of joint configuration samples are generated according to an ordering of a plurality of nonfunctional DOF groups using a respective entity-specific sampling module for each nonfunctional DOF group. A final joint configuration sample is generated for one or more one or more control points using a respective entity-specific sampling module for a functional DOF group. A motion comprising a sequence of respective joint configuration samples from each of the plurality of DOF groups is generated.

20 Claims, 11 Drawing Sheets

(56) References Cited

U.S. PATENT DOCUMENTS

| | | | |
|---|---|---|---|
| 6,470,225 | B1 | 10/2002 | Yutkowitz |
| 6,493,607 | B1 | 12/2002 | Bourne et al. |
| 6,804,580 | B1 | 10/2004 | Stoddard et al. |
| 9,411,335 | B2 | 8/2016 | Kim et al. |
| 9,649,764 | B1 | 5/2017 | Sun et al. |
| 2004/0149065 | A1 | 8/2004 | Moran |
| 2004/0254771 | A1 | 12/2004 | Reiner et al. |
| 2009/0312867 | A1 | 12/2009 | Hasegawa et al. |
| 2014/0278091 | A1 | 9/2014 | Horvitz et al. |
| 2015/0127151 | A1 | 5/2015 | Riedel et al. |
| 2016/0023352 | A1 | 1/2016 | Kennedy et al. |
| 2018/0173206 | A1 | 6/2018 | Pollock et al. |
| 2019/0366543 | A1 | 12/2019 | Butterfoss |
| 2020/0061820 | A1 | 2/2020 | McDaniel |
| 2020/0086486 | A1 | 3/2020 | Graichen et al. |

OTHER PUBLICATIONS

Dean et al. "An Analysis of Time-Dependent Planning," AAAI, Aug. 1988, 6 pages.

Li et al. "A Review on Integrated Process Planning and Scheduling," Int. J. Manufacturing Research, vol. 5(2), Jan. 2010, 20 pages.

Martin et al. "Technology and Innovation for the Future of Production: Accelerating Value Creation," White paper, World Economic Forum, Mar. 2017, 5 pages.

PCT International Preliminary Report on Patentability in International Appln. No. PCT/US2019/034989, dated Dec. 1, 2020, 7 pages.

PCT International Search Report and Written Opinion in International Appln. No. PCT/US2019/34989, dated Aug. 16, 2019, 13 pages.

Ruml et al. "On-line Planning and Scheduling: An Application to Controlling Modular Printers," Journal of Artificial Intelligence Research vol. 40, Feb. 2011, 5 pages.

Sun et al. "A Model-Driven Approach to Support Engineering Changes in Industrial Robotics Software," International Conference on Model Driven Engineering Languages and Systems, Sep. 2012, 15 pages.

International Search Report and Written Opinion in International Appln. No. PCT/US2021/054382. dated Jan. 26, 2022, 10 pages.

* cited by examiner

EXTENSIBLE UNDERCONSTRAINED ROBOTIC MOTION PLANNING

BACKGROUND

This specification generally relates to robotics, and more particularly to motion planning systems.

Robotic systems have been used to automate a wide range of tasks, including tasks in industrial settings such as painting, assembly, picking and placing for printed circuit boards, package and labeling, palletizing, product inspection, and material handling. In some applications, one or more robots in a system are each configured to perform tasks within a shared workspace, and the robots are each capable of moving about the workspace in two or more axes.

Robotics motion planning has traditionally required immense amounts of manual programming in order to meticulously dictate how the robotic components should move in order to accomplish a particular task. Manual programming is tedious, time-consuming, and error prone.

In addition, robots have a number of drawbacks that make automatic motion planning difficult.

First, robots naturally have a very complex, high-dimensional, and continuous action space. Thus, it is computationally expensive to generate and evaluate all sequences of possible candidate joint configurations.

An additional complication is that robotic motion planning tends to be extremely brittle. This means that even if a workable motion plan is successfully generated, even tiny changes to the task, the robot, components of the system, or the environment can cause the motion plan to become unusable. When this happens, the time it would take to generate a new motion plan is computationally unbounded.

Moreover, conventional motion planning algorithms are often highly domain-specific. In other words, the actions of the motion planning process often rely on major assumptions about the operating environment. For example, a motion planning algorithm can operate on the assumption that the system has 9 total degrees of freedom and search for a sequence of joint configurations based on those exact 9 degrees of freedom. However, if something should change about the operating environment that does not conform to those assumptions, the entire motion planning algorithm itself could be completely unusable. For example, suppose that a component of the system is upgraded or replaced and that the updated component has additional degrees of freedom that are not in the original motion planning algorithm. In that case, the only solution might be for highly skilled engineers to perform the time-consuming task of manually re-engineering the motion plan, or the motion planning algorithm itself, from scratch to account for the additional degrees of freedom.

SUMMARY

This specification describes an underconstrained motion planner that can generate motions for kinematic systems having an arbitrary number of connected entities. To do so, the underconstrained motion planner can use degree-of-freedoms (DOF) groups that represent respective portions of the kinematic system. The DOF groups can each have an entity-specific sampling strategy that employs specialized views. In this specification, a view is an interface that provides a representation of a particular subsystem from a particular perspective. By using entity-specific sampling strategies and entity-specific views, the system can use the same motion planning process even when components change or additional degrees of freedom are incorporated into the system.

Particular embodiments of the subject matter described in this specification can be implemented so as to realize one or more of the following advantages. The techniques described in this specification allow a motion planning system to efficiently generate motions for kinematic systems having an arbitrary number of degrees of freedom. This means that changes to the components of the system does not require changes to the motion planning process. The entity-specific sampling strategies discussed below allow for increased computational efficiency by performing sampling that is tuned in different ways for different entities. This arrangement provides a framework for a computationally tractable motion planning for an unbounded number of degrees of freedom in the kinematic system. In addition, the framework discussed below is highly modular, which means that the sampling strategies developed by other engineering teams can be easily incorporated into the motion planning process. This makes the system easier to use and more accessible to non-expert users because such users do not need to know anything about motion planning or sampling strategies. Rather, the expertise of others can be incorporated seamlessly into the system. In addition, the techniques below that allow for solving for motions using sequences of joint configurations allow for local refinements without requiring recomputation of the results from scratch. This capability also allows for more sophisticated collision checking, which can be particularly important when planning motions for highly complex kinematic systems.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

In general, this specification describes systems, methods, devices, and other techniques for planning motion of one or more robots to improve the positioning and placement of one or more tools carried by the robot that exhibits under-constrained motion. A system can include a planning module that is capable of automating the execution of a task by a robotic system. As an example, the task can be a milling operation that advances a rotary cutter into an object at a certain direction to remove material from the object. The task can be defined by a tool, e.g., a rotary cutter that is manipulated by the robotic system while executing the task.

Figure 1:
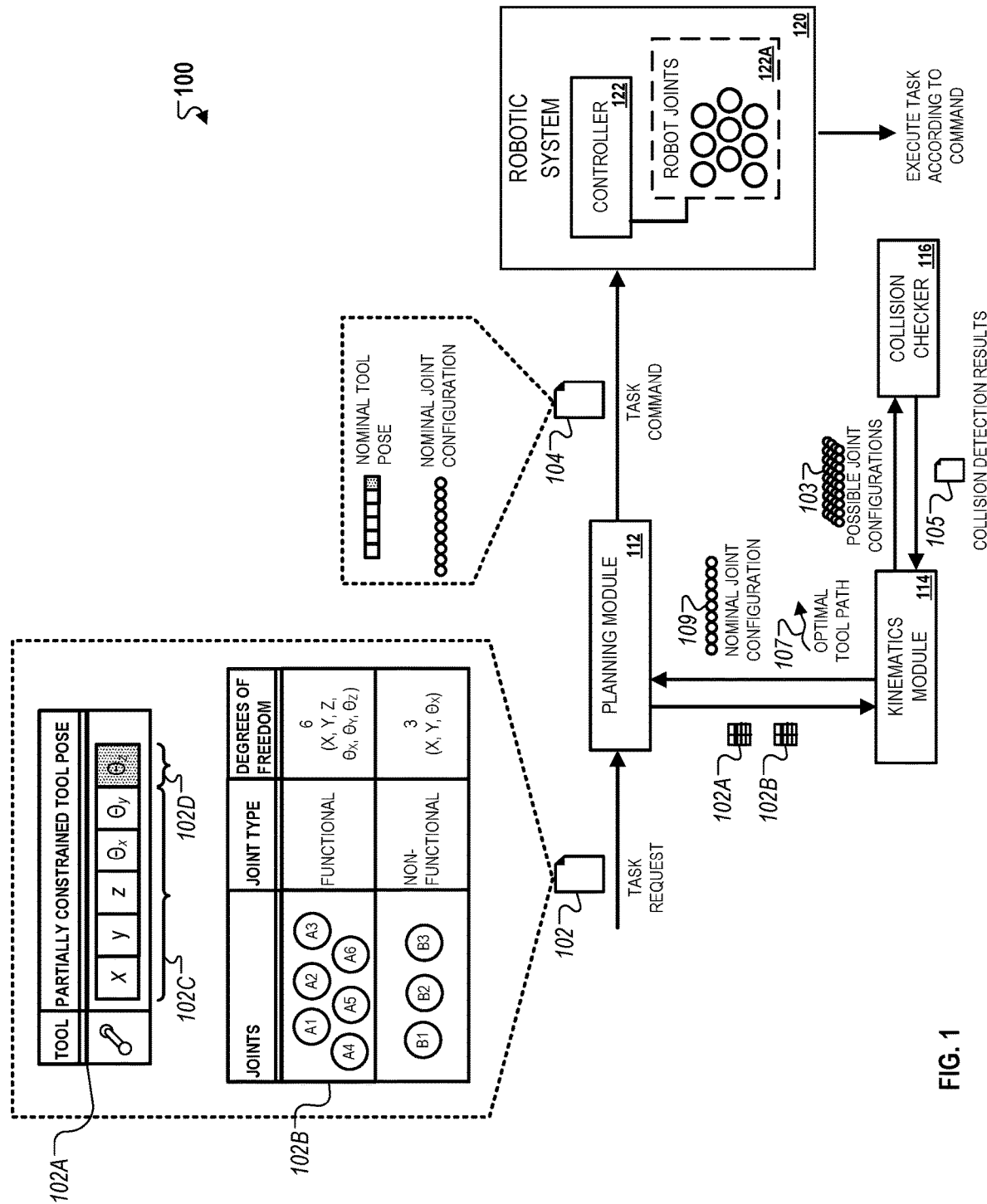
FIG. 1 illustrates an example of a motion planning system.

FIG. 1 illustrates an example of a motion planning system 100. The system 100 can include a motion planning module 112, a kinematics module 114, a collision checker 116, and a robotic system 120. In the example depicted in FIG. 1, the system 100 generates a command to automate the execution of a task by the robotic system 120 based on a target pose of a tool to be manipulated during execution of the task.

Referring briefly to the process depicted in FIG. 1, the planning module 112 initially receives a task request 102 that identifies a nominal pose 102A for the tool and joint information 102B for the robotic system 120. The kinematics module 114 and the collision checker 116 process the data included in the task request 102 to identify an optimal tool path 107, a nominal tool pose for the tool, and a nominal joint configuration 109 for the robotic system 120. The planning module 112 generates a task command 104 based on the output of the kinematics module 114 and the collision checker 116. The task command 104 is provided to a controller 122 of the robotic system 120, which then directs the robotic system 120 to perform the task according to the task command 104.

Referring now to the components of the system 100, the planning module 112, the kinematics module 114, and the collision checker 116 can be software modules that are executed on a variety of computing devices. For example, the planning module 112, the kinematics module 114, and the collision checker 116 can be implemented on a computing device that is located in the same facility as the robotic system 120. The computing device can be a general purpose computer that is configured to exchange communications with the controller 122, or alternatively, a special purpose computer that is specifically manufactured to operate with the robotic system 120. In other examples, the computing device can be server system that is remote from the facility where the robotic system 120 is located and configured to exchange communications with the controller 122 of the robotic system through a network medium such as the Internet or an intranet associated with the facility of the robotic system 120.

The robotic system 120 can be an industrial robot with programmable logic that is used to adjust robot joints 122A of the robotic system 120 to permit automated task execution. In some implementations, the robotic system 120 includes multiple robots. The controller 122 can receive instructions to configure the robot joints 122A to enable specified types of movement. For example, the robotic system 120 can be a robotic arm with links that attached at joints to permit movement along six degrees of freedom.

The robotic system 120 can engage tools to perform certain tasks, such as moving the tool to a specified coordinate location along a certain trajectory, rotating a tool relative to a certain axis, attaching two tools together, aligning a tool relative to a reference plane, among others.

The planning module 112, the kinematics module 114, and the collision checker 116 can be implemented to be logically distinct, e.g., executed as independently operating software, and/or physically distinct, e.g., implemented on different computing systems. For example, the planning module 112 can be executed on a computing device that is located in the same facility as the robotic system 120 whereas the kinematics module 114 and the collision checker 116 can be executed on a server system in a separate location.

The robotic system 120 can be configured to execute functional and non-functional motions when executing a task. Functional motions refer to motion in which a tool is engaged and the position of the tool is monitored relative to a target position. For example, tasks that involve moving a tool or aligning the tool represent functional motions. Non-functional motion refers to joint space point-to-point motion that does not involve engaging a tool. For example, motion of the robotic system 120 to a starting point prior to initiating the task represents non-functional motion.

Joints of the robotic system 120 that are moved during a functional motion can represent functional joints. During a functional move, functional joints of the robotic system 120 are moved while non-functional joints remain stationary. For example, joints of a base of a robotic arm remain stationary while joints on the robotic arm are moved to execute a milling task.

The joints of the robotic system 120 can be static or dynamic in various implementations. In some implementations, the joints of the robotic system 120 are static such that they are always designated as representing a functional joint or a non-functional joint regardless of the task to be performed by the robotic system 120. For example, joints on a robot arm can be always designated as functional joints whereas joints on the base of the robot arm can be designated always designated as non-functional joints. In other implementations, joints of the robotic system 120 are dynamic such that their designation as representing either a functional joint or a non-functional joint is dependent on the type of task to be performed by the robotic system 120. For example, base joints can be designated as functional joints when all relevant tolerances are loose enough above a specified threshold, and designated as non-functional joints otherwise.

Referring now to the technique depicted in FIG. 1, the planning module 112 initially receives a task request 102. The task request 102 identifies a nominal pose 102A for a tool to be engaged by the robotic system 120 during the task, and joint information 102B for the robot joints 122A of the robotic system 120.

The pose 102A can represent under constrained motion of the tool during execution of the test. The pose 102A can be represented as a set of pose parameters, which includes constrained pose parameters 102E and one or more unconstrained pose parameters 102D. In the example shown in FIG. 1, the constrained pose parameters 102C indicate that the tool is constrained with respect to movement along the x, y, and z axis and rotation along the x and y axis. Additionally, the unconstrained pose parameters 102D indicate that the tool is not constrained with respect to rotation along the z axis. In some instances, the set of pose parameters can also include pose parameters identifying tolerance ranges for motion along each degree of freedom (DoF) as discussed below in reference to FIGS. 2A and 2B.

The joint information 102B identifies the number of joints and joint classification for each joint and the degrees of freedom. In the example shown in FIG. 1, the robotic system 120 includes nine joints. Six joints A1-A6 are located on a robotic arm and three joints B1-B3 are located on a base station beneath the robotic arm. As discussed above, joints A1-A6 are functional joints since they can be used to perform functional motions that involve engaging a tool, and joints B1-B3 are non-functional joints since they are not used in functional motion. In this example, joints A1-A6 have six degrees of freedom (e.g., they are configured for movement and rotation along three axis) whereas joints B1-B3 have three degrees of freedom (e.g., they are configured for movement along "x" and "y" axis and horizontal rotation).

The kinematics module 114 processes the nominal pose 102A and the joint information 102B to identify a set of possible joint configurations 103. The process of identifying the set of possible joint configurations 103 is discussed in detail in FIG. 3. Each joint configuration in the set of joint configurations 103 can represent an alternative configuration for the robot joints 122A of the robotic system 120 given their respective degrees of freedom and the target pose of the tool after the task has been executed.

The kinematics module 114 can use algorithmic techniques to identify information associated with the set of possible joint configurations 103. For example, the kinematics module can include a "Solve" algorithm that accepts the nominal pose 102A and the joint information 102B as input and generates the set of possible configurations 103 based on the input.

As another example, the kinematic module 114 can include a "SolvePartial" algorithm that additionally passes fixed values for one or more joints of the robot joints 122A. Using this algorithm, the kinematic module 114 samples only the controller null space since the actuator null space is empty, such as when base joints are fixed for functional moves.

As yet another example, the kinematic module 114 can include a "SolveAround" algorithm that can be used to identify joint configurations that are similar to the set of joint configurations 103. These joint configurations can be used by the robotic system 120 to simply the motion of the robotic system 120 while executing the task. For example, a task can involve two motions to be performed sequentially. In this example, a set of possible joint configurations (and similar configurations) can be associated with each motion. Once the robotic system 120 has completed the first motion, the robotic system 120 can search the set of similar configurations that are associated with the second motion to identify the next joint configuration. In this example, because each motion is associated with a finite set of joint configurations, the robotic system 120 can quickly filter the set of joint configurations and select the most appropriate joint configuration.

The collision checker 116 evaluates the set of possible joint configurations 103 and estimates the likelihood that executing the task with a particular joint configuration will result in a collision. For example, the collision checker 116 can correlate anticipated motion trajectories for multiple joints of the robotic system 120 to determine that two components of a robotic arm of the robotic system 120 are likely to collide with each other. As another example, the collision checker 116 can evaluate motion trajectories of joints to determine whether a component of the robotic system 120 is likely to collide an object surrounding the robot such as a structure associated with the tool engaged during the task. Collision detection results 105 are provided to the kinematics module 114 and used to identify a nominal joint configuration 109 from among the possible joint configurations 103. Collision detection is discussed below in detail in reference to FIG. 4.

The planning module 112 receives data generated by the kinematics module 114 and the collision checker 116 to generate the task command 104. The task command 104 identifies a nominal tool pose, which represents an expected or target pose for the tool once the robotic system 120 has executed the task. The task command 104 is provided to the controller 122 to direct the robot joints 122A according to the nominal joint configuration and execute the task according to planned motion (e.g., nominal pose of the tool).

Figure 2A:
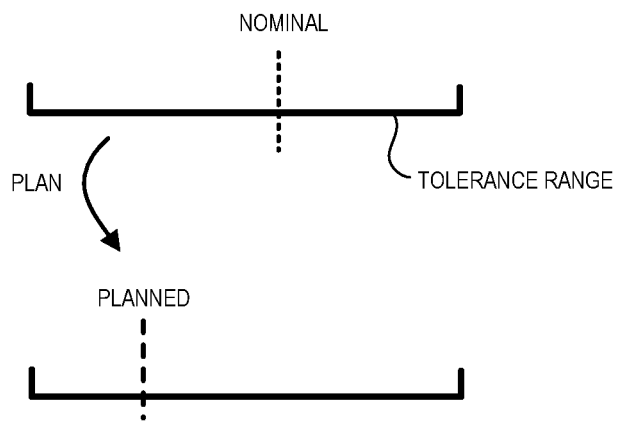
FIGS. 2A and 2B illustrate examples of motion ranges for a motion planning system.
Figure 2B:
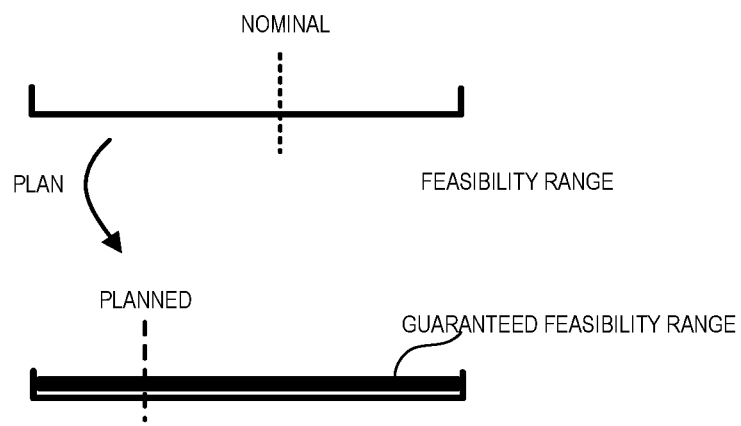

FIGS. 2A and 2B illustrate examples of motion ranges for a motion planning system. Referring initially to FIG. 2A, an example of a tolerance range for a nominal pose is depicted. As discussed above, a nominal pose for a tool defines the expected or target pose after the robotic system 120 executes a task. The planning module 112 uses the nominal pose of the tool and the nominal joint configuration to plan the motion of the robot joints while the robotic system 120 executes the task according to the planned motion.

As shown in FIG. 2A, the planning module 112 plans motion based on a tolerance range around the nominal pose for the tool. The tolerance range defines an acceptable range in which a position controlled DoF can still satisfy task requirements as specified within the task request 102. For example, free rotation around a nozzle for a gluing task can be expressed as a single tolerance range $[-\pi, \pi]$ on $\theta Z$. In another example, an angle grinder may specify two ranges $\{[0, 0], [-\pi, \pi]\}$ to indicate a mirror symmetry of the tool.

The tolerance range can be used to define a range of motion that produces that pose that might not be exactly the nominal pose but is close enough to satisfy task requirements. For instance, while the nominal value for a sensor controlled DoF is the expected position of the DoF based on a nominal model, this nominal value is often unlikely to ever be exactly executed by the controller 122 of the robotic system 120. The tolerance range therefore permits the controller 122 to execute a value that is different from the nominal value but still achieve a successful result.

The tolerance range can also be used to indicate a desired precision with which a task should be executed. For example, a larger tolerance range can be used with tasks that require lower precision, thereby allowing the controller 122 to execute a broader range of motion while still satisfying the task requirements. As another example, a smaller tolerance range can be used with tasks that require higher precision, thereby requiring a narrower range of motion to successfully satisfy the task requirements.

Referring now to FIG. 2B, an example of a feasibility range is depicted. A feasibility range defines a range in which a sensor controlled DoF is expected to operate relative to the nominal pose. To ensure that the planning module 112 can effectively plan motion for executing the task, a pose tool is expected to be within the feasibility range. For example, a force controlled DoF following a surface with a 0.001 m precision (based on property of the surface), the tool is expected to stay between a feasibility range defined by −0.001 m and 0.001 m. Thus, the planning module 112 ensures that a single feasible solution exists within the tolerance range whereas it also ensures that the a substantial or whole portion of the feasibility range is feasible for execution.

Figure 3:
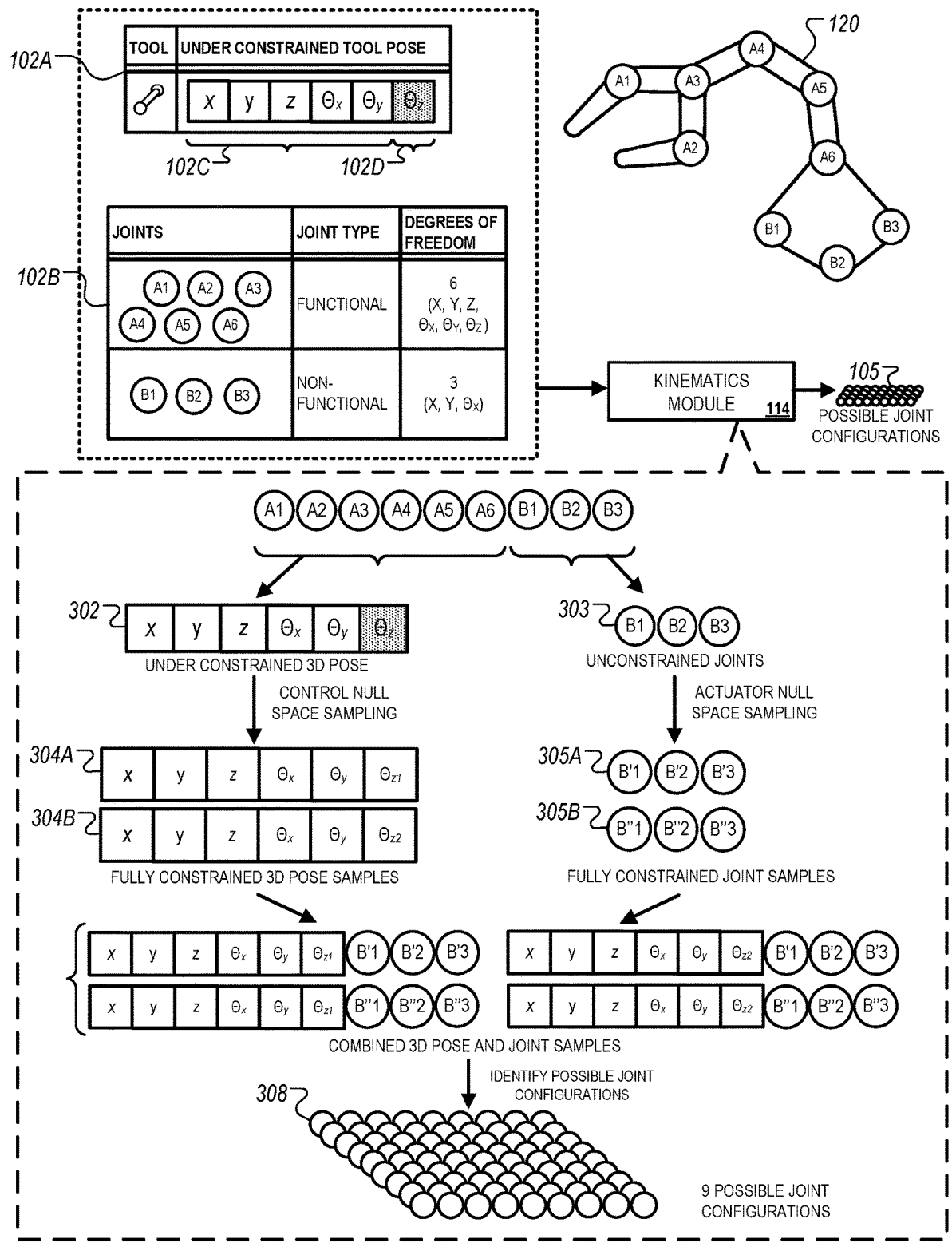
FIG. 3 illustrates an example of a technique for determining joint configurations for a robotic system to execute a task with a tool.

FIG. 3 illustrates an example of a technique for determining joint configurations for a robotic system to execute a task with a tool. In the example, the kinematics module 114 identifies a set of possible joint configurations 103 for a robotic system 120 when performing a task. As discussed above in reference to FIG. 1, the set of possible joint configurations 103 is determined based on the nominal pose 102A for the tool to be engaged by the robotic system 120 and the joint information 102B for robot joints of the robotic system 120.

As shown in FIG. 3, the kinematics module 114 processes functional joints (e.g., joints A1-A6) in a different manner than non-functional joints (e.g., joints B1-B3). This is because, as discussed above, during functional motions, non-functional joints are locked such that only the functional joints are moved to according to planned motion.

In the example depicted in FIG. 3, the kinematics module 114 uses a "Solve" algorithm to identify a set of possible joint configurations that allows the robotic system 120 to achieve the nominal pose 102A for the tool. The kinematics module 114 initially determines an under constrained three-dimensional pose 302 for functional joints (e.g., joints A1-A6) that have six DoF. The kinematics module 114 then generates fully constrained three-dimensional pose samples 304A and 304B by sampling the control null space of the under constrained DoF (e.g., Θz). In parallel, the kinematics module 114 also identifies unconstrained joints 303 (e.g., joints B1-B3) with three DoFs and samples the actuator null space of the unconstrained joints 303 to generate fully constrained joint samples 305A and 305B. The pose samples 304A and 304B and the joint samples 305A and 305B are then combined to generate possible control/actuator sample combinations 306A, 306B, 306C, and 306D. The kinematics module 114 then identifies all possible joint configurations for the control/actuator sample combinations 306A-D.

Figure 4:
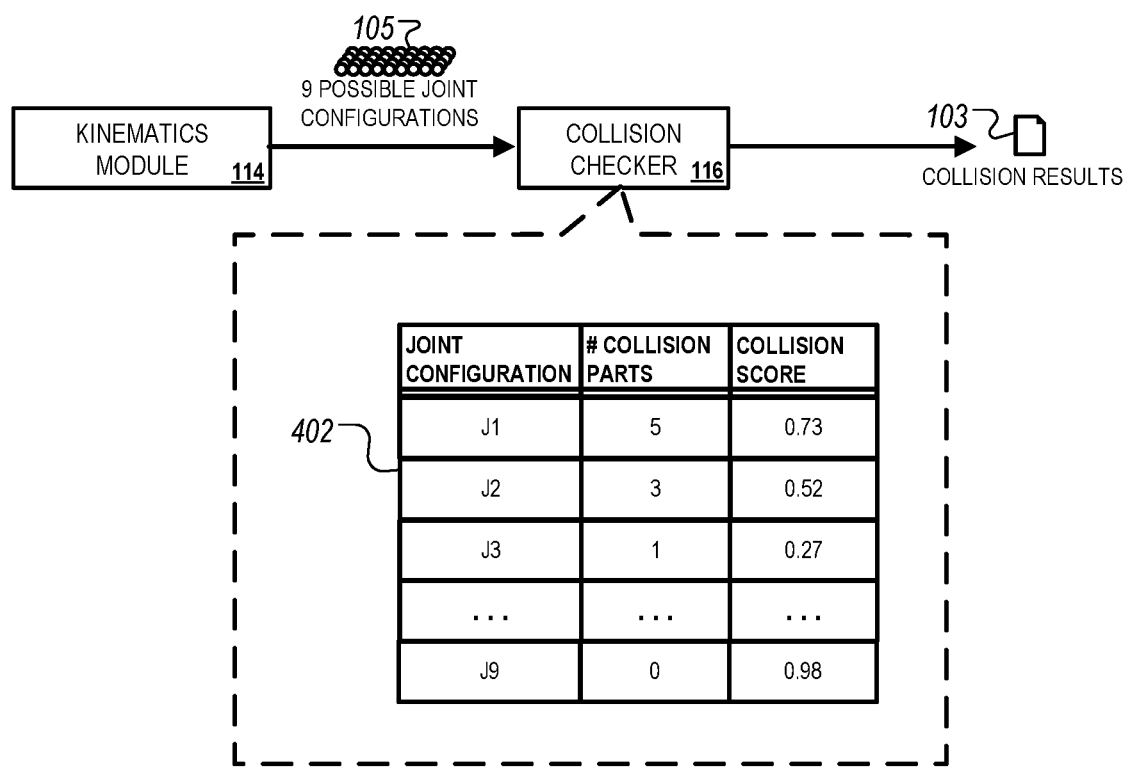
FIG. 4 illustrates an example of a technique for predicting the likelihood of a collision occurring for possible joint configurations of a robotic system.

FIG. 4 illustrates an example of a technique for predicting the likelihood of a collision occurring for possible joint configurations of the robotic system 120. In the example, the collision checker 116 receives data indicating the possible joint configurations 103 for the joints of the robotic system 120 as discussed above in reference to FIG. 1. The collision checker 116 evaluates motion trajectories associated with each of the possible joint configurations to determine a likelihood of a collision occurring. For example, the collision checker can evaluate the motion of each component of the robotic system 120 and determine, for instance, if two components come in close proximity with one another during task execution, if a component comes in close proximity with an object in the environment surrounding the robotic system 120, or if the tool engaged by the robotic system 120 comes into close proximity with an object and/or a component of the robotic system 120.

In addition, the collision checker 116 can distinguish between collisions that are acceptable (e.g., collisions that are expected during a task because the motion involved is the attachment of a tool to another object). In such instances, the collision checker 116 identifies functional collision body pairs that represent bodies associated with an acceptable collision. For example, a tool used for milling can represent an object that is included in a functional collision body pair. In some instances, the collision checker 116 is configured to dynamically determine whether a collision for a particular tool or component is permissible in relation different types of motions that are being performed throughout the execution of the task. For example, a tool used for cutting can be permitted to collide with another component when the robotic system 120 performs a cutting operation, but not permitted to collide when the robotic system performing any other action that is not a cutting operation. In this example, the collision checker 116 may disregard possible collisions during cutting operations since they are permissible, but identify possible collisions during other times when the robotic system 120 is not performing a cutting operation.

In the example depicted in FIG. 4, the collision checker 116 generates a table 402 that identifies, for each joint configuration, a number of components that are likely to have a possibility of being involved in a collision and a collision score representing a predicted likelihood that the applying the joint configuration will result in at least one impermissible collision during execution of the task. As discussed above, the collision checker 116 can compute the collision scores such that only the possibility of impermissible collisions (and not permissible collisions) are factored in the computation of the collision scores.

As shown in FIG. 4, of the nine possible joint configurations included in the set of possible joint configurations 103, joint configuration J9 is determined to have the highest likelihood of at least one impermissible collision occurring during execution of the task using that joint configuration because the collision checker 116 determines that its collision score has a value of "0.98." In this example, the planning module 112 uses this information in the collision detection results 105 to reduce the likelihood that joint configuration J9 is selected as the nominal joint configuration that is referenced in the task command 104 provided to the controller 122.

Figure 5:
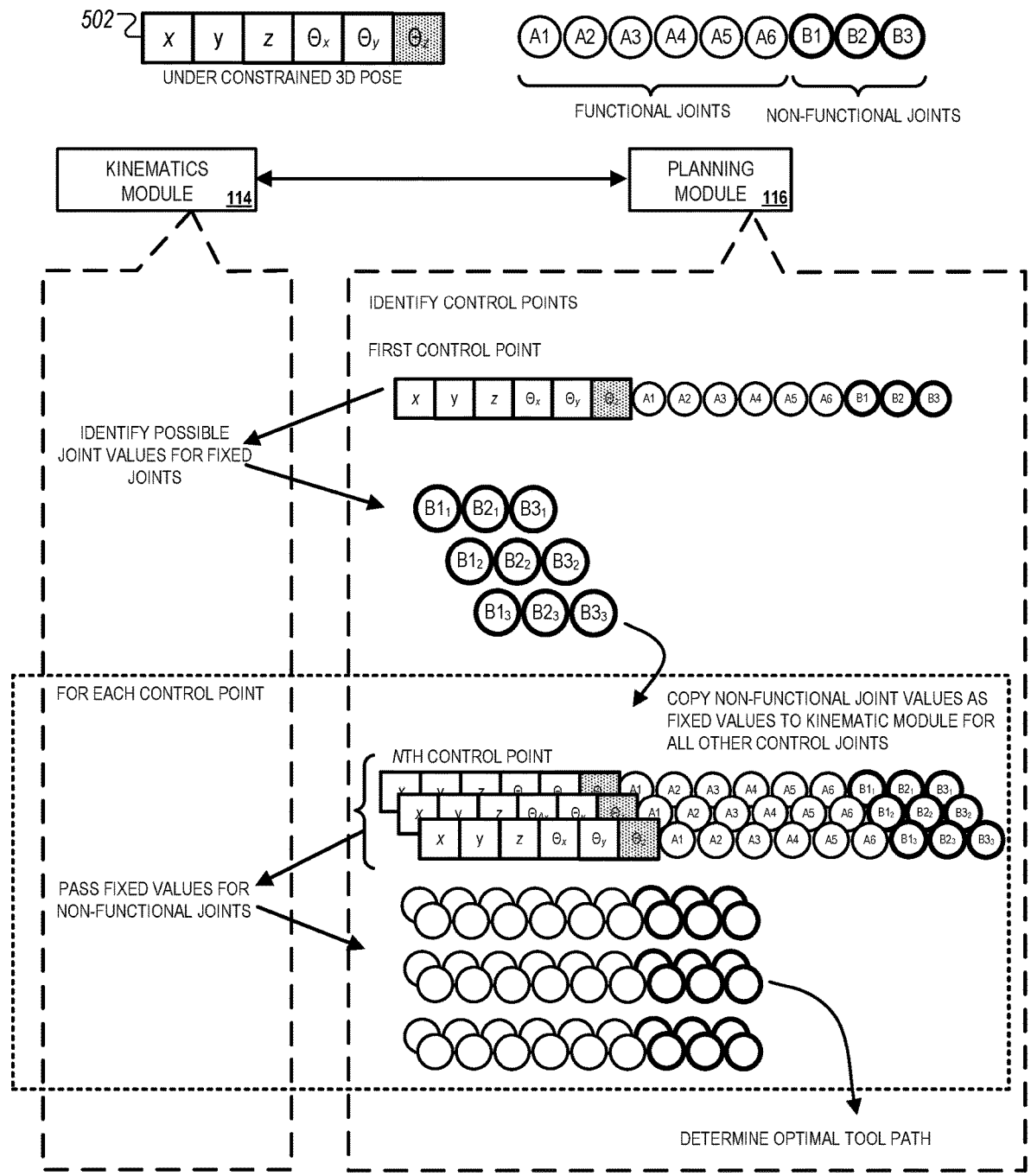
FIG. 5 illustrates an example of a technique for predicting an optimal trajectory for a robotic system to execute a task with a tool.

FIG. 5 illustrates an example of a technique predicting an optimal trajectory for a robotic system to execute a task with a tool. In the example, the planning module 112 applies a "SolvePath" algorithm that is configured to identify possible trajectories for joint configurations. A trajectory refers to a continuous section of control points that represent motion of the robotic system 120 when performing a task according to a specified joint configuration. For example, if a trajectory is defined by three control points, then the robotic system 120 moves from the first control point to the second control point and then finally to the third control point in executing a specified task. Because the execution of a task can involve multiple possible trajectories, the technique depicted in FIG. 5 can be applied by the kinematic module 114 and the planning module 112 to identify a joint configuration that, for instance, minimizes joint motion between control points (and therefore minimizes unnecessary movement by the robotic system 120).

The planning module 112 identifies control points for the task based on the joint information for the robotic system 120 (e.g., total number of joints, number of functional joints, and number of non-functional joints). For example, the control points can be determined based on the number of joint movements that are required to perform a specified task. The kinematic module 114 and the planning module 112 then evaluate identify possible joint configurations at each control point and then identify an optimal path by determining the path that has the least amount of joint motion between consecutive control points. For example, if the planning module 112 identifies two control points that each have two possible joint configurations, then there are a total of four paths with the different possible joint configurations (e.g., four possible joint configurations). In this example, the kinematic module 114 evaluates joint motion that is predicted to occur with each joint configuration and then determines the optimal path based on the joint configuration.

In the example depicted in FIG. 5, the kinematic module 114 and the planning module 112 identifies an optimal trajectory based on an under constrained three-dimensional pose 502 for a tool to be engaged and joint information for the robotic system 120. In this example, the robotic system 120 has nine joints, including a set of functional joints (e.g., joints A1-A6) and a set of non-functional joints (e.g., joints B1-B3). As discussed above, functional joints refer to joints that are moved in relation functional motion of a tool engaged during a task and non-functional joints refer to joints that remain stationary during execution of the task. Because the non-functional joints are not moved in relation to the nominal pose, the kinematic module 114 identifies and evaluates possible joint configurations for the non-fixed joints using the technique depicted in FIG. 5.

In some implementations, the robotic system 120 only has functional joints that are moved during functional motions associated with execution of a task. In such implementations, the kinematics module 114 identifies a set of possible joint configurations that satisfy an under constrained pose 502 for the tool. The pose 502 represents constraints on movement of the tool during execution of the task. For instance, the pose 502 specifies a set of constrained parameters that represent constrained movement (e.g., x, y, z, θx, θy) and an under constrained parameter that represents under constrained movement (e.g., θz). In this example, motion of the tool to be engaged by the robotic system 120 is constrained along all axis except for rotation around the z axis. In such implementations, the optimal path is calculated as the path that minimizes joint motion between consecutive points.

In other implementations, such as the example depicted in FIG. 5, where robotic system 120 has non-functional joints, the system assigns joint values to non-functional joints in the manner as shown in FIG. 5. This technique can be repeated for each control point to identify an optimal trajectory of joint configurations that minimizes joint motion between control points.

As shown in FIG. 5, the kinematic module 114 identifies possible joint configurations for non-functional at the first control point of the task using a similar technique as discussed previously with respect to FIG. 3. The non-functional joint is then assigned fixed values based on the possible joint configurations. In the example depicted in FIG. 5, the kinematics module 114 identifies three possible joint configurations for joints B1-B3 and then assigns fixed values for each of the three possible joint configurations. This process is then repeated for all of the remaining control points so that the fixed joint values for the non-functional joints are copied to the other control points. The optimal path is calculated as the path with the greatest number of control points that can be executed using the same set of non-functional joint values.

Figure 6:
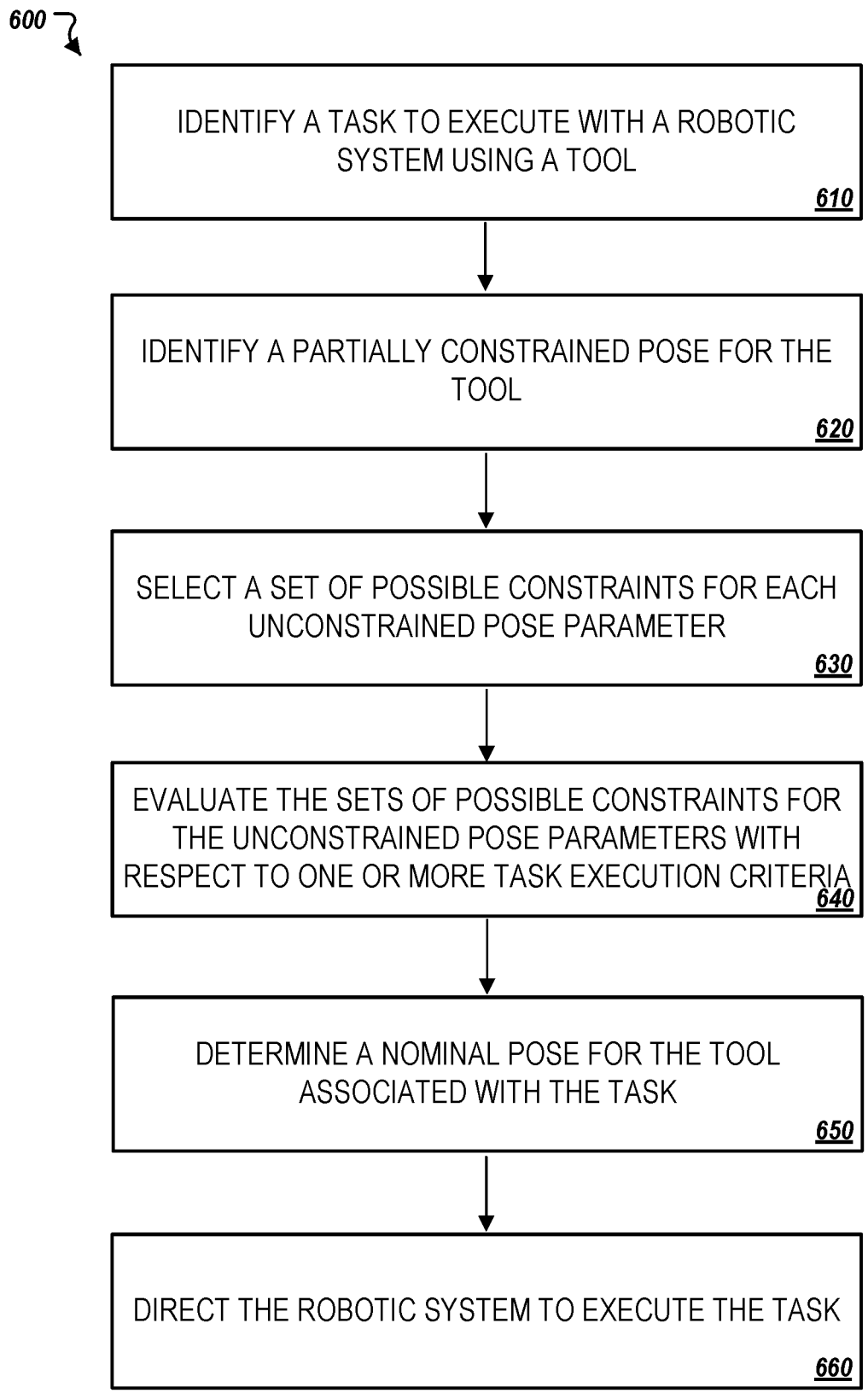
FIG. 6 illustrates an example of a process for automating the execution of a task by a robotic system.

FIG. 6 illustrates an example of a process 600 for automating the execution of a task by a robotic system. Briefly, the process 600 can include the operations of identifying a task for execution by a robotic system (610), identifying a partially constrained pose for the tool (620), selecting a set of possible constraints for each unconstrained pose parameter (630), evaluating the sets of possible constraints for the unconstrained pose parameters with respect to one or more task execution criteria (640), determining a nominal pose for the tool associated with the task (650), and directing the robotic system to execute the task (660).

The process 600 is generally described below in reference to FIG. 1 although any motion planning system that includes an industrial robot can be capable of executing the operations of the process 600. Additionally, one or more of the operations of the process 600 can be executed by a computing system associated with a robotic system, or alternatively, by a server system that is housed separately from the facility in which the system is located. As an example, the operations of the process 600 can be performed by the system 100, which can be implemented on a central server system that is exchanges data communications with the robotic system 120 over any suitable network medium. As another example, the operations of the process 600 can be performed by software running on a system that is configured to specifically control the robotic system 120 and is housed in the same facility as the robotic system 120.

In more detail, the process 600 can include the operation of identifying a task for execution by a robotic system (610). For example, the planning module 112 can identify a task to execute with the robotic system 120 using a tool. As discussed above, the task can represent different types of industrial operations that are performed by the robotic system 120, such as a milling operation that advances a rotary cutter into an object at a certain direction to remove material from the object. The planning module 112 can identify the task based on processing the task request 102 to identify the tool to be engaged by the robotic system 120.

The process 600 can include the operation of identifying a partially constrained pose for the tool (620). For example, the planning module 112 can identify a partially constrained pose 102A for a tool that is to apply during execution of the task. As discussed above in reference to FIG. 1, the pose 102A can define constraints for a set of pose parameters 102C that represent constrained motion for the tool during execution of the task. The pose 102A can also include one or more undefined pose parameters that represent unconstrained motion for the tool during execution of the task. For example, if motion of the tool is constrained in all DoF except for rotation about the z axis, then the pose parameters 102C can include pose parameters that represent motion along the x, y and z axis, and pose parameters that represent rotation along the x and y axis. In this example, the pose parameters 102D includes a single pose parameter for the z axis that is undefined to represent unconstrained rotation along the z axis.

The process 600 can include the operation of selecting a set of possible constraints for each unconstrained pose parameter (630). For example, the kinematics module 114 can control null space sampling to identify possible constraints for each unconstrained pose parameter within the pose 102A. In the example depicted in FIG. 3, the kinematics module 114 can generate constraints for the pose parameter 120D, which represents an unconstrained pose parameter.

The process 600 can include the operation of evaluating the sets of possible constraints for the unconstrained pose parameters with respect to one or more task execution criteria (640). For example, the kinematics module 114 can evaluate the sets of possible constraints for the unconstrained pose parameters with respect to certain task execution criteria associated with the task. The task execution criteria can identify, for example, an acceptable tolerance range surrounding the target location of a tool, a feasibility range under which the robotic system 120 is configured to operate, or a degree of precision for executing the task. Other examples of task execution criteria involve applying a cost function to identify a maximum amount of joint motion for executing the task, an amount of energy to be used in executing the task, among others.

The process 600 can include the operation of determining a nominal pose for the tool associated with the task (650). For example, the planning module 112 can identify a nominal pose for the tool based on a result of evaluating the sets of possible constraints for the unconstrained pose parameters with respect to the one or more task execution criteria. As discussed above, the nominal pose defines the expected or target pose of the tool after the robotic system 120 executes a task. The nominal pose of the tool can be used to identify nominal joint configurations for joints of the robotic system 120 in order to plan motion of the robotic system 120 while executing the task. For example, as discussed above in reference to FIG. 3, the nominal pose 102A and joint information 102B can be processed in parallel to identify the set of possible joint configurations 308 using a control null sampling technique by generating fully constrained three-dimensional pose samples and combining them with fully constrained joint samples.

The process 600 can include the operation of directing the robotic system to execute the task (660). For example, the planning module 112 can generate the task command 104 to identify a nominal pose of the tool and a nominal joint configuration for joints 122A of the robotic system 120. The task command 104 can be provided to the controller 122 to direct the robotic system 120 to execute the task and position the tool according to the nominal pose.

The techniques described above can be extended to generate motions for kinematic systems having an arbitrary number of connected elements.

Figure 7:
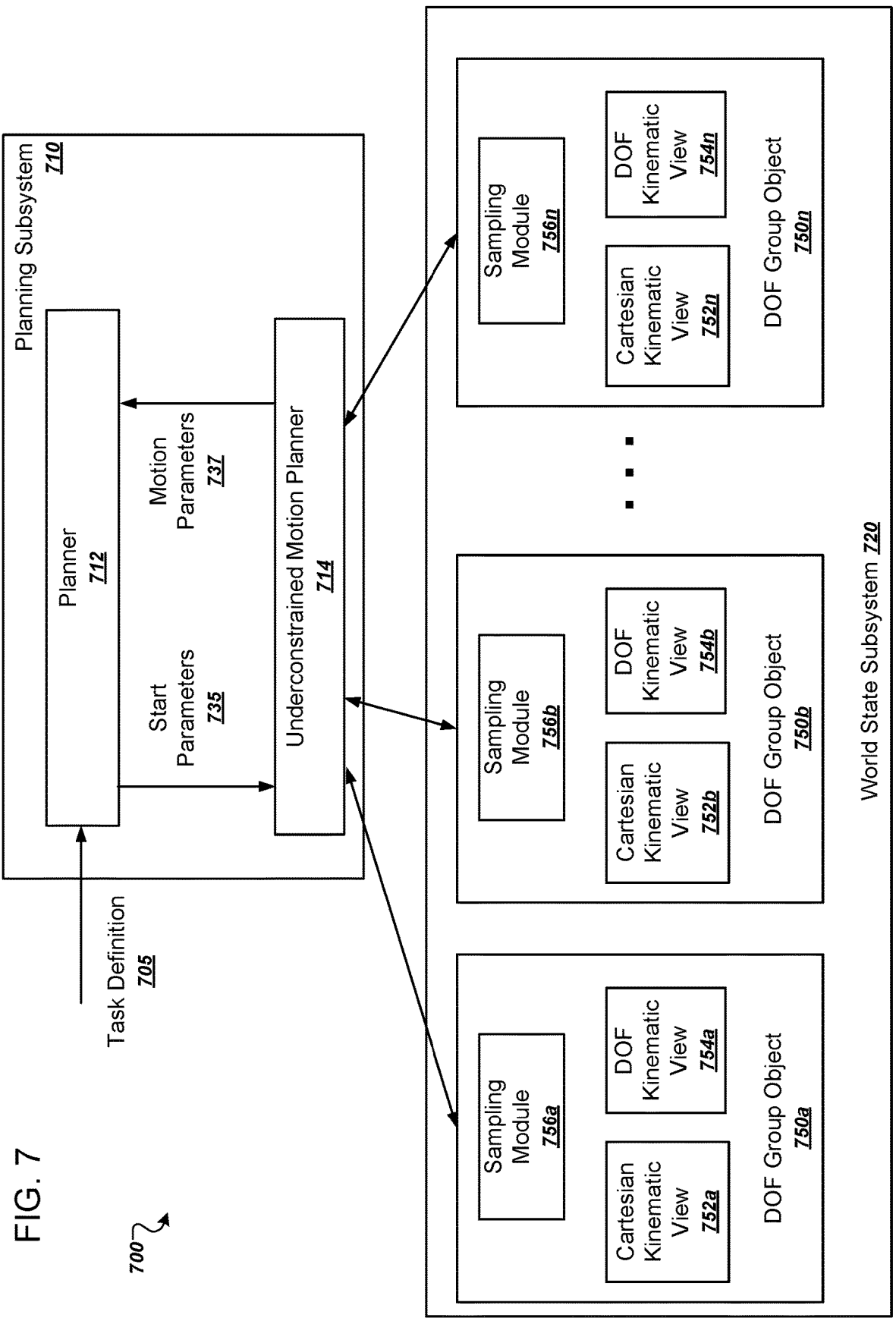
FIG. 7 is a diagram of an example system that uses an underconstrained motion planner to generate a motion.

FIG. 7 is a diagram of an example system 700 that uses an underconstrained motion planner 714 to generate a motion. The underconstrained motion planner 714 is an example of a system that can solve for a motion using an arbitrary number of degree-of-freedom (DOF) groups that each represent different connected entities in the operating environment. In this context, a motion is defined by a sequence of joint configurations through which a robot should move to reach each of one or more control points, which can be points in space at which a particular task is to be performed, e.g., welding or gluing a workpiece.

The underconstrained motion planner 714 is a part of a planning subsystem 710 that includes a planner 712. The planner 712 can be implemented similar to the planning module 112 as described above with reference to FIG. 1. In other words, the planner 712 can receive a task definition 705 that specifies a task having one or more objectives. The planner 712 can then communicate with the underconstrained motion planner 714 to generate one or more motions for accomplishing the task as specified in the task definition 705. The underconstrained motion planner 714 can communicate with a world state subsystem 720, which can maintain state information about simulated or real entities in an operating environment. Typically, the planner 712 operates by simulating the motions and interactions of components that are or will be physically connected in a physical operating environment. In addition, the planner can use mass distributed computing techniques to evaluate multiple different motion possibilities in parallel.

Each of the planner 712, the underconstrained motion planner 714, and the world state subsystem 720 can be implemented by computer programs installed on one or more computers in one or more locations. For example, these components can be installed in a planning computer system that is housed in a facility that operates one or more robots or can be installed in a cloud-based planning system housed in a remote datacenter.

In general, the underconstrained motion planner 714 can solve a single motion based on start parameters 735 received from the planner 712. The start parameters 735 can specify a start position and, optionally, a starting pose or a starting orientation of a component in the operating environment, as well as one or more control points.

In response, the underconstrained motion planner 714 can provide back to the planner 712 motion parameters 737 that define a sequence of joint configurations. It is not always possible to find a single motion that visits all control points, and therefore, the motion parameters 737 may include joint configurations for fewer than all control points. The underconstrained motion planner 714 can thus repeat the process to generate one or more additional motions that cover all control points specified in the start parameters 735. In some implementations, the underconstrained motion planner 714 automatically generates motions until all control points are reachable by at least one joint configuration in a motion and returns all resulting motions as motion parameters 737.

After generating the sequence of joint configurations that define the motion parameters 737, the planner 712 can proceed to further refine a lower-level robotic control plan. For example, the planner 712 can use the one or more motions to generate paths through the joint configurations using one or more path planning procedures. The planner 712 can make further refinements by generating trajectories that define force, acceleration, or torque parameters for controlling robotic components to follow the generated paths to assume the joint configurations that effectuate the one or more motions.

In order to solve for a motion using multiple entities, the underconstrained motion planner 714 can use a plurality of corresponding DOF groups. Each DOF group represents one or more degrees of freedom of a respective entity in the kinematic system. There may be, but need not be, a one-to-one correspondence between entities in the kinematic system and DOF groups. For example, some DOFs of a robot can be represented by a single DOF group, and other DOFs of the same robot can be represented by another DOF group.

The world state subsystem 720 can represent each DOF group using a DOF group object 750*a-n*. Each DOF group object 750*a-n* represents a respective entity in the operating environment that can be manipulated through one or more degrees of freedom to generate the motion. For example, a first DOF group can represent a mobile robot base, a second DOF group can represent a robot arm, and a third DOF group can represent a movable tool attached to the robot arm.

Each DOF group object 150*a-n* has a pair of specialized views: a Cartesian kinematic view and a DOF kinematic view. In this specification, a view is an interface that provides a representation of a particular system object from a particular perspective. In general, the Cartesian kinematic view and DOF kinematic views have visibility into some or all of the state information of the entities that they represent.

The Cartesian kinematic views and the DOF kinematic views essentially provide a layer of software abstraction that allows the underconstrained motion planner 714 to solve motions for an arbitrary number of entities in an operating environment without needing to alter its motion finding algorithm. In other words, the underconstrained motion planner 714 does not need to know anything about the entities that it is solving motions for. Rather, all knowledge about how entities in the operating environment behave under particular manipulations to their degrees of freedom can be encoded and represented in the functionality associated with the DOF group objects 150*a-n*. This avoids the underconstrained motion planner 714 from needing to be configured with hard-coded logic about how to solve motions for particular entities, which can vary due to many factors including differences in workcells, robot model, sensors, and other entities in the operating environment.

Each view implements an interface having two basic operation types: 1) query for state and 2) modify degrees of freedom.

The first type of view, the Cartesian kinematic view, maintains information about an entity relative to another entity in Cartesian space. The other entity may or may not be one of the entities represented by one of the DOF groups 750a-n. For example, when the entity is an end effector of a robot arm, the other entity can be an object to be manipulated. The other entity may also be the robot arm to which the end effector is attached. As another example, if the DOF group entity is a movable robot base, the other entity can be a reference frame of the operating environment or a point in that reference frame. In some implementations, the Cartesian kinematic view maintains data representing a pair of reference frames to encode the information about the relative positions of the entities in the operating environment.

Thus, querying a Cartesian kinematic view for an entity's state information can cause a Cartesian kinematic view to provide information representing how the pair of reference frames are oriented relative to one another. For example, querying a Cartesian kinematic view can result in the Cartesian kinematic view indicating that a movable robot base is 2 meters away from an origin frame of the robotic operating environment.

A Cartesian kinematic view can interpret a request to modify degrees of freedom as a request to find a solution to an inverse kinematics (IK) problem. Thus, each Cartesian kinematic view 752a-n can be equipped with one or more IK solvers that are specific to the entity that the DOF group for the Cartesian kinematic view represents. For example, the underconstrained motion planner 714 can provide a modify request to the Cartesian kinematic view 752a that requests that the maintained reference frames be placed a particular distance, e.g., 2 cm, apart in Cartesian space. This can, for example, represent a welding tool being placed into position to start a welding action on a particular workpiece.

In response to the modification request, the Cartesian kinematic view 752a can use an IK solver for the welding tool or for a robotic arm to which the welding tool is attached to generate one or more sets of DOF values that can be used to effectuate the request. The Cartesian kinematic view 752a can then provide the resulting one or more sets of DOF values back to the underconstrained motion planner 714. Alternatively or in addition, the Cartesian kinematic view 752a can actually effectuate the requested changes, which can be accomplished by providing a particular set of DOF values to a corresponding DOF kinematic view.

The second type of view, the DOF kinematic view, maintains information about an entity in joint space. Querying the DOF kinematic view can therefore cause the DOF kinematic view to provide the current values of degrees of freedom for the entity, e.g., joint angles, positions, or other values in joint space, to name just a few examples.

A modification request to a DOF kinematic view can cause the DOF kinematic view to update the state of the entity by effectuating the requested DOF modifications. Again, as described above, during the motion planning process, the entity effectuated by the DOF modifications is typically a virtual entity rather than a physical entity. However, a physical entity could also be used.

Thus, for example, the DOF kinematic view 754b can receive a modification request to change an angle of a joint of a robot arm, and the DOF kinematic view 754b can in response change the angle of the robot arm accordingly. The DOF kinematic view 754b can then provide a status update back to the underconstrained motion planner 714, which can indicate success, failure, or a deviation from the requested modification.

As mentioned briefly above, a modification request to a Cartesian kinematic view can cause the Cartesian kinematic view to provide resulting IK parameters to the DOF kinematic view, or a separate, hidden DOF kinematic view that is not exposed to the underconstrained motion planner 714, to effectuate the changes necessary to satisfy the modification request.

Each DOF group object also has an entity-specific sampling module 756a-n. Each sampling module generates a set of valid joint configuration samples for a given input state. The sampling module essentially explores the joint space of reachable states from a given input state. The input state can be specified in any appropriate format, e.g., as a position in Cartesian space, joint space, or as a representation of a particular entity pose. In some implementations, the input state is implicitly the current state of the entity being represented by the associated DOF group object.

The entity-specific sampling modules 756a-n provide a software abstraction that prevents the underconstrained motion planner 714 from needing to be hard-coded with information about the capabilities and motions of the entities. For example, the sampling techniques that are appropriate for a robot arm having six degrees of freedom will probably be vastly different from the sampling techniques for a lift that has only one degree of freedom.

The underconstrained motion planner 714 can use the DOF group objects to generate a motion by evaluating the DOF groups in a particular ordering. At each step in the sequence, the underconstrained motion planner 714 can use candidate joint configurations generated by previous steps in the sequence as initial conditions.

After generating a motion defined by a plurality of joint configurations, the underconstrained motion planner 714 can provide motion parameters 737 back to the planner 712. If control points were not covered by the resulting motion, the planner 712 can direct the underconstrained motion planner 714 to generate another motion for the remaining control points, or the underconstrained motion planner 714 can be configured to take such action automatically until all control points are accounted for by the generated motions.

Figure 8:
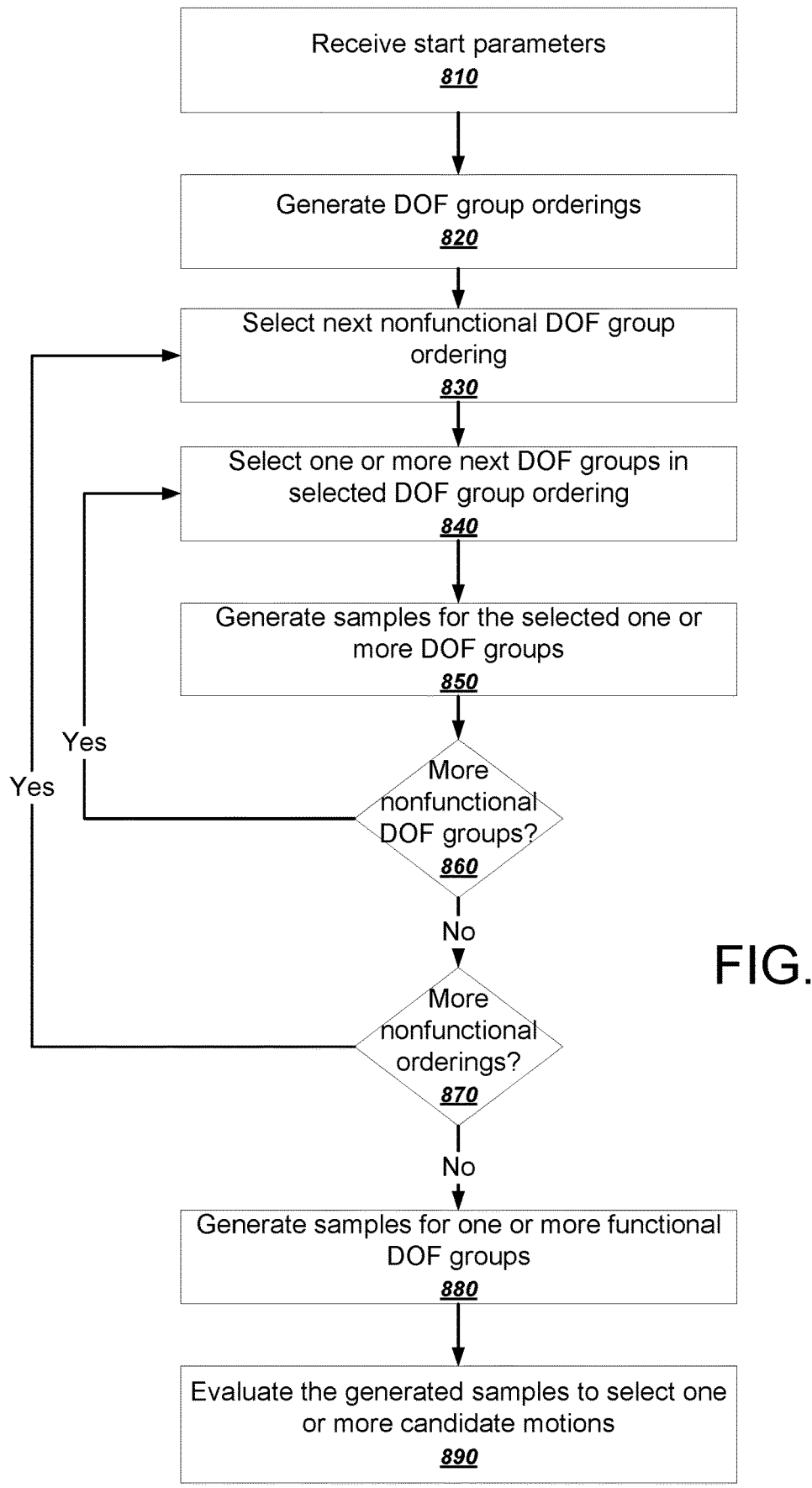
FIG. 8 is a flowchart of an example process for generating a motion using an arbitrary number of connected entities each being represented by a DOF group.

FIG. 8 is a flowchart of an example process for generating a motion using an arbitrary number of connected entities each being represented by a DOF group. In addition to being able to generate motions for an arbitrary number of DOF groups, the example process is an example of an extensible motion planning process that can be used to generate motions after adding additional connected entities to a kinematic system. The process in FIG. 8 is an example of a process that can be performed by an underconstrained motion planner, e.g., the underconstrained motion planner 714 of FIG. 7. The example process will be described as being performed by a system of one or more computers in one or more locations.

The system receives start parameters (810). For example, the system can receive an initial position and one or more control points that should be visited during a motion. In many cases, the initial position is the last control point that was visited during a previously generated motion.

The system generates DOF group orderings for entities in the operating environment (820). As described above, the DOF groups can correspond to entities in the operating environment, and the system can generate one or more orderings among the DOF groups.

In general, a first DOF group for a first entity being before a second DOF group for a second entity means that the system will execute a movement for the first entity, and then execute a second movement for the second entity. In other words, the eventual movements that make up the motion will be executed according to the sequence in the DOF group. The degrees of freedom for entities earlier in the ordering will be assumed to be completely or substantially fixed while subsequent movements are performed.

In some implementations, functional DOF groups for entities that perform functional motions are ordered last in the DOF group orderings. Note that there can be multiple functional DOF groups, e.g., when different parts of a same robot arm are represented by different DOF groups, or when multiple components cooperate to perform a single functional motion.

For nonfunctional DOF groups, the system can generate any appropriate number of orderings. When the number of nonfunctional DOF groups is sufficiently small, the system can generate a predetermined number of different orderings or all combinations of orderings of nonfunctional DOF groups.

The DOF group orderings can also be partial orderings, meaning that multiple different DOF groups can be evaluated in parallel. This can be used for example, when multiple nonfunctional motions can be performed simultaneously. For example, if a mobile base also has a lift, these two DOF groups can be evaluated simultaneously because the motions of moving the base and raising the lift can be executed simultaneously. Therefore, in some situations the system might generate nonfunctional DOF group orderings representing moving and then lifting, lifting and then moving, or doing both simultaneously. As another example, a warehouse can have ceiling beams that support a movable rail, and on the moveable rail, a base suspends a full 6-DOF robotic arm. In that system, the x-motion and y-motion of the base along the rail and beams are motions that can be performed simultaneously.

The system selects a next nonfunctional DOF group ordering (830). The nonfunctional DOF group ordering specifies a full or partial order of DOF groups for the connected entities in the system that will perform nonfunctional motions.

The system selects one or more next DOF groups in the selected DOF group ordering (840). The system can maintain information representing which of one or more DOF groups are currently being processed.

The system generates samples for the selected one or more DOF groups (850). As described above, each DOF group can be represented by a DOF group object having its own entity-specific sampling module. Thus, the system can specify an initial condition for the entity specific sampling module for the currently selected DOF group, as well as information representing the one or more control points for the requested motion.

The sampling module can use the Cartesian kinematic view for the DOF group to sample in Cartesian space or the DOF kinematic view for the DOF group to sample in joint space. For example, the sampling module can generate a point cloud around a particular location and use the Cartesian kinematic view to obtain DOF values that define new joint configuration samples for positioning the corresponding entity at the particular location. Alternatively or in addition, the sampling module can use the DOF kinematic view to perturb DOF values and use the resulting new positions as new joint configuration samples.

As noted above, the sampling module can encode logic about the particular entity represented by the DOF group. For example, for a robot arm, sampling in joint space may be more computationally efficient than sampling in Cartesian space where many IK solutions have to be generated and evaluated. On the other hand, for a mobile base, sampling in Cartesian space may be more computationally efficient than sampling in joint space because the corresponding motions are relatively simple. Therefore, in the course of generating the motion, the system can sample some components in joint space and some in Cartesian space in order to improve the computational efficiency of the process.

The sampling module can also use the control points to guide the sampling process. For nonfunctional motions, it is often most efficient to move as close as possible to a control point as quickly as possible. Therefore, the sampling module for nonfunctional DOF groups can explore samples that generate joint configurations as close as possible to one or more control points. In some implementations, the ending location has an implicit offset to allow for space of the end effector system, e.g., a robot arm, to operate. Thus, for example, for a mobile base, the goal might not be to drive as far as possible, but to drive as close as possible to the location of a first control point minus a particular offset.

The initial condition during sampling often depends on the sampling results of a previous DOF group in the ordering. In other words, the starting location for a sampling procedure can be defined by a sample generated previously.

Although the number of candidate joint configurations grows quickly by the number of DOF groups, the computations can be parallelized in a distributed computing system. For example, all candidate joint configurations generated for the first DOF group can be fanned out to different machines in a distributed computing system, which can each then perform the sampling process for the second DOF group in the ordering.

The system can also employ a variety of pruning techniques to control the number of possibilities that are considered. First, each sampling module can be tuned for the number of samples generated. In addition, the sampling module can use the DOF kinematic view for the DOF group to perform collision checking. In other words, the sampling module can use the DOF kinematic view to simulate the effects of a particular joint configuration candidate and reject those that would result in a collision with other entities in the system. Notably, the underconstrained motion planner need not be programmed with any collision checking processes or knowledge of how the underlying kinematic systems operate. Rather, this functionality is implemented as part of the entity-specific sampling processes of the corresponding DOF group object.

The system determines if there are more nonfunctional DOF groups to evaluate (860). If so, the system selects the next DOF group in the selected DOF group ordering (branch to 840).

If not, the system determines if there are more nonfunctional DOF group orderings to evaluate (870). If so, the system selects a next nonfunctional DOF group ordering to evaluate (branch to 830).

If not, the system generates samples for one more functional DOF groups (branch to 880). As described previously, the functional movements can take into consideration constraints of a nominal pose for the control points, as well as any unconstrained parameters for that pose. Thus, for example, the system can generate multiple different functional joint configurations for each unconstrained pose parameter.

Similarly to the nonfunctional DOF groups, each functional DOF group can use an entity-specific sampling module to generate candidate joint configurations. In the case of a functional DOF group, however, the joint configurations will be oriented around a particular control point. Or, if no control points are reachable from an initial condition defined by previous movements in the process, the system can raise an error.

If multiple control points are reachable from the initial condition, the system can generate multiple joint configurations to represent multiple movements reaching those multiple control points. In a typical situation, the ideal solution is when the nonfunctional movements move the kinematic system to a location where the most number of control points are reachable.

The system evaluates the generated samples to select one or more candidate motions (890). After generating all candidate joint configurations for nonfunctional and functional DOF groups, the system can evaluate sequences of joint configurations as candidate motions. The system can use a cost function that considers distance traveled, expected elapsed time, and number of control points covered by the motion. For example, a motion that takes longer to move a mobile base but which covers three control points can be preferable to a motion that makes a shorter initial base movement but only covers two control points.

In order to reduce the search space, the system can also perform inline cost evaluation while generating samples. For example, after generating samples for group N of the DOF group ordering, the system can compute a cost function for motions between the samples for group N and the samples for group N−1. The system can then prune samples that don't meet a particular cost threshold, or the system can prune all but a particular number of samples occurring on the lowest-cost candidate motions.

The system can then select one or more candidate motions according to the cost function. As described above, if there were additional control points that were not covered, the system can repeat the example process to generate one or more additional motions starting from the end point of the generated motion that was selected according to the cost function.

Figure 9A:
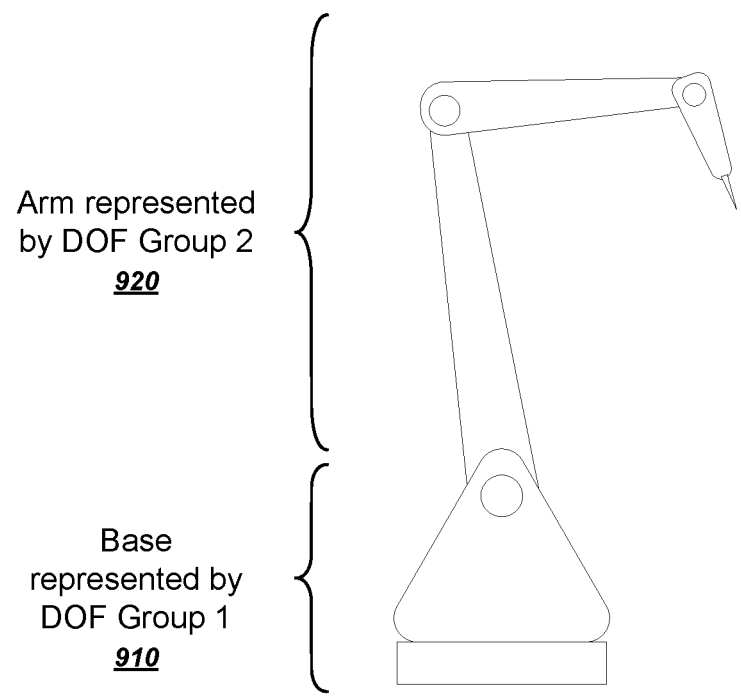
FIGS. 9A, 9B, and 9C illustrate examples of kinematic systems that can use the underconstrained motion planner described above Like reference numbers and designations in the various drawings indicate like elements. The components shown here, their connections and relationships, and their functions, are meant to be exemplary only, and are not meant to limit the implementations described and/or claimed in this document.
Figure 9B:
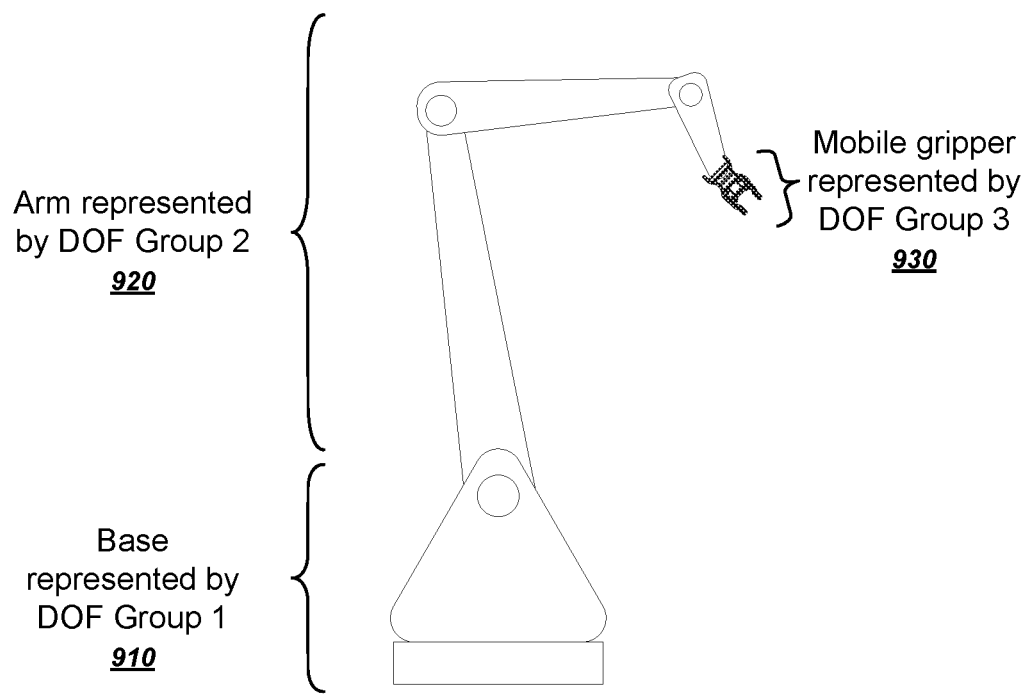
Figure 9C:
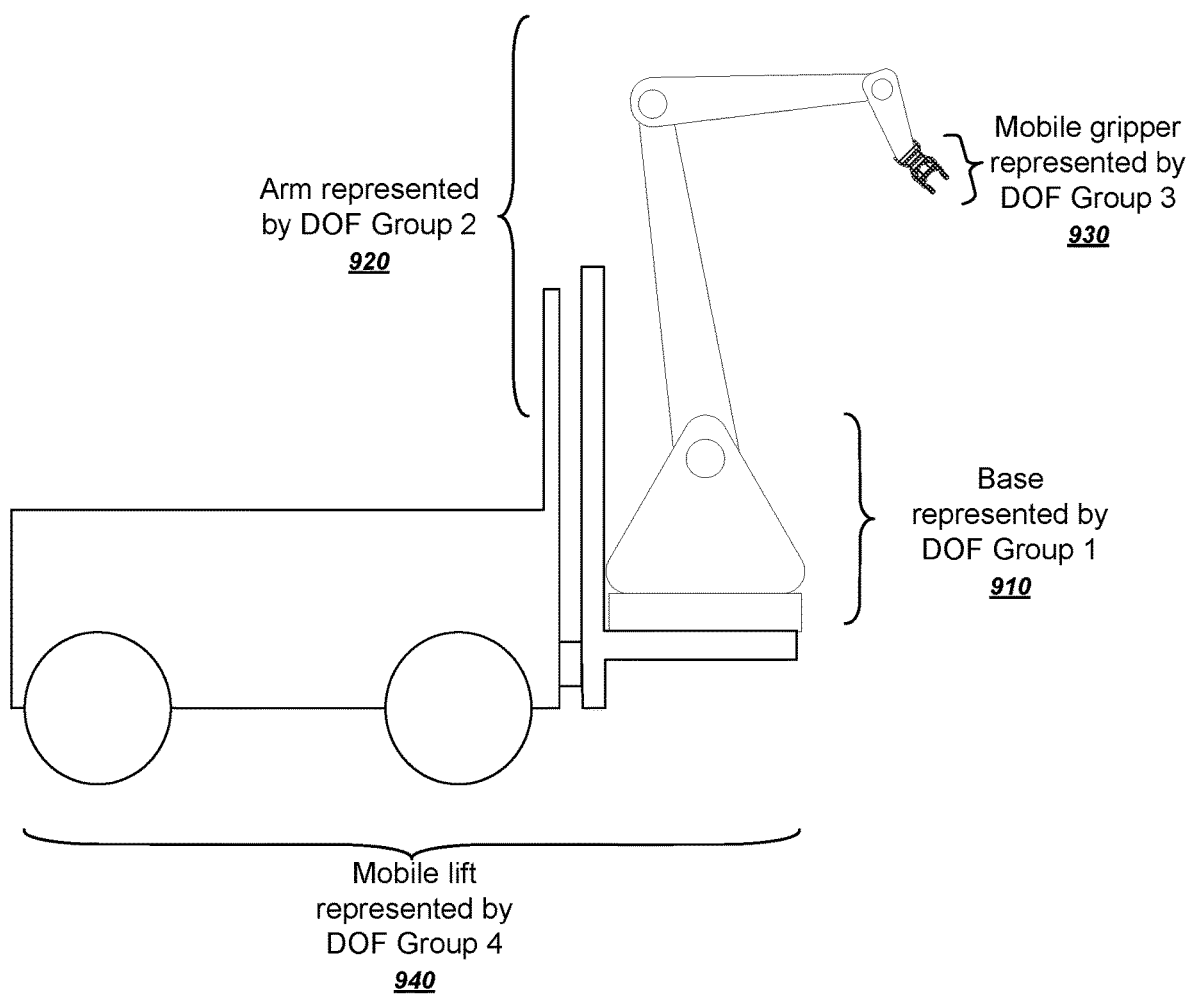

FIGS. 9A-C illustrate examples of kinematic systems that can use the underconstrained motion planner described above.

FIG. 9A illustrates a robot having a base 910 represented by a first DOF group, DOF Group 1, and an arm 920 represented by a second DOF group, DOF Group 2. In this example, DOF Group 2 is a functional DOF group and DOF Group 1 is a nonfunctional DOF group, and therefore the underconstrained motion planner can generate a motion by first sampling for the base 910 and then sampling for the arm 920, as described above with reference to FIG. 8. The samples can be generated by entity-specific sampling modules using entity specific Cartesian kinematic views, DOF kinematic views, or both.

The techniques described in this specification are extensible to arbitrarily complex systems. For example, the same process can be performed when additional DOF groups are added.

In FIG. 9B, the tool of the arm 920 is replaced by a mobile gripper 930 that has some degrees of freedom forward and backward and which can be rotated. Thus, the mobile gripper 930 can be represented by a third DOF group, DOF Group 3, which has its own Cartesian kinematic view, DOF kinematic view, and sampling module.

In this example, DOF Group 2 for the arm 920 might be considered a nonfunctional DOF group because the final movement to the control point will be accomplished by the mobile gripper 930. Thus, the system can perform the process described above with reference to FIG. 8 to evaluate two different orderings of nonfunctional DOF groups. In other words, the system can generate samples that represent moving the base first then the arm as well as samples that represent moving the arm first then the base. In addition, the ordering of DOF groups can be a partial ordering such that the samples can represent moving both entities simultaneously.

In FIG. 9C, the kinematic system becomes increasingly complex by attaching the entire arm system to a mobile lift 940. The mobile lift 940 can drive forward and backward and the lift can be raised up and down. Despite this added complexity, the same process described above can be used to generate a motion for this complex system by representing the mobile lift 940 with a fourth DOF group, DOF Group 4, which is another nonfunctional DOF group with its own sampling module employing a lift-specific sampling strategy. Because the motions of the mobile lift are relatively simple, the sampling module for the mobile lift might generate samples in Cartesian space, even though all other DOF groups generate samples in joint space. This is an example of how the system can improve computational efficiency by using entity-specific sampling strategies.

During the motion generation process, the system can evaluate samples generated by the nonfunctional DOF groups in different orders. For example, the following orders can be evaluated: 4, 1, 2; 4, 2, 1; 1, 4, 2; 1, 2, 4; 2, 1, 4; 2, 4, 1.

The architecture of the system described here, e.g., as illustrated in FIG. 7, also allows for improved system modularity. For example, there are multiple different engineering entities who could supply the components described in this specification. For example, any of the DOF group object software components, e.g., the sampling module and the views, can be provided by a robot manufacturer, a robot system installer, a robot installation operator, a third-party component manufacturer, or a third-party software developer. The components can then be plugged into the kinematic system, and the underconstrained motion planner does not need to be changed in order to continue to efficiently generate motion plans for the system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving a request to generate a motion for a kinematic system having a plurality of connected entities, wherein the request specifies one or more control points in a robotic operating environment;
obtaining data representing a plurality of degree-of-freedom (DOF) groups, each DOF group representing a respective entity of plurality of entities of the kinematic system, wherein the DOF groups comprise a plurality of nonfunctional DOF groups and a functional DOF group;
identifying an entity-specific sampling module for each DOF group, wherein each entity-specific sampling module is configured to use a Cartesian kinematic view for the DOF group, a DOF kinematic view for the DOF group, or both, to generate joint configuration samples;
obtaining an ordering of the plurality of nonfunctional DOF groups;
generating, by a respective entity-specific sampling module for each nonfunctional DOF group of the plurality of nonfunctional DOF groups, a plurality of joint configuration samples according to the ordering of the plurality of nonfunctional DOF groups;
generating, by a respective entity-specific sampling module for the functional DOF group, a final joint configuration sample for one or more of the one or more control points; and
generating a motion comprising a sequence of respective joint configuration samples from each of the plurality of DOF groups.

Embodiment 2 is the method of embodiment 1, wherein generating the plurality of joint configuration samples according to the ordering of the plurality of nonfunctional DOF groups comprises generating joint configuration samples from an initial condition generated by a joint configuration sample generated for a previous nonfunctional DOF group in the ordering.

Embodiment 3 is the method of any one of embodiments 1-2, wherein generating, by a respective entity-specific sampling module for each nonfunctional DOF group of the plurality of nonfunctional DOF groups, a plurality of joint configuration samples comprises sampling a first DOF group in Cartesian space and sampling a second DOF group in joint space.

Embodiment 4 is the method of any one of embodiments 1-3, wherein the Cartesian kinematic view for a DOF group is configured to receive a relative pose value representing a relative pose between two reference frames and to perform one or more inverse kinematic processes to generate updated degree-of-freedom values to effectuate the relative pose value.

Embodiment 5 is the method of any one of embodiments 1-4, wherein the DOF kinematic view for a DOF group is configured to receive an updated DOF value and update state information for a representation of a corresponding entity.

Embodiment 6 is the method of any one of embodiments 1-5, further comprising:
receiving an update to the kinematic system, wherein the update adds an additional entity having an associated new DOF group;
obtaining a new ordering of the plurality of nonfunctional DOF groups, the new ordering including the new DOF groups; and
generating a new motion that incorporates the update to the kinematic system, wherein the new motion includes a new joint configuration sample for the new DOF group.

Embodiment 7 is the method of embodiment 6, wherein the new joint configuration sample is generated by a new entity-specific sampling module for the new DOF group.

Embodiment 8 is the method of any one of embodiments 1-7, wherein the ordering of the plurality of nonfunctional DOF groups is a partial ordering representing two or more entities being moved simultaneously.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a request to generate a motion for a kinematic system having a plurality of connected entities, wherein the request specifies one or more control points in a robotic operating environment;
obtaining data representing a plurality of degree-of-freedom (DOF) groups, each DOF group representing a respective entity of plurality of entities of the kinematic system, wherein the DOF groups comprise a plurality of nonfunctional DOF groups and a functional DOF group;
identifying an entity-specific sampling module for each DOF group, wherein each entity-specific sampling module is configured to use a Cartesian kinematic view for the DOF group, a DOF kinematic view for the DOF group, or both, to generate joint configuration samples;
obtaining an ordering of the plurality of nonfunctional DOF groups;
generating, by a respective entity-specific sampling module for each nonfunctional DOF group of the plurality of nonfunctional DOF groups, a plurality of joint configuration samples according to the ordering of the plurality of nonfunctional DOF groups;
generating, by a respective entity-specific sampling module for the functional DOF group, a final joint configuration sample for one or more of the one or more control points; and
generating a motion comprising a sequence of respective joint configuration samples from each of the plurality of DOF groups.

2. The method of claim 1, wherein generating the plurality of joint configuration samples according to the ordering of the plurality of nonfunctional DOF groups comprises generating joint configuration samples from an initial condition generated by a joint configuration sample generated for a previous nonfunctional DOF group in the ordering.

3. The method of claim 1, wherein generating, by a respective entity-specific sampling module for each nonfunctional DOF group of the plurality of nonfunctional DOF groups, a plurality of joint configuration samples comprises sampling a first DOF group in Cartesian space and sampling a second DOF group in joint space.

4. The method of claim 1, wherein the Cartesian kinematic view for a DOF group is configured to receive a relative pose value representing a relative pose between two reference frames and to perform one or more inverse kinematic processes to generate updated degree-of-freedom values to effectuate the relative pose value.

5. The method of claim 1, wherein the DOF kinematic view for a DOF group is configured to receive an updated DOF value and update state information for a representation of a corresponding entity.

6. The method of claim 1, further comprising:
receiving an update to the kinematic system, wherein the update adds an additional entity having an associated new DOF group;
obtaining a new ordering of the plurality of nonfunctional DOF groups, the new ordering including the new DOF groups; and
generating a new motion that incorporates the update to the kinematic system, wherein the new motion includes a new joint configuration sample for the new DOF group.

7. The method of claim 6, wherein the new joint configuration sample is generated by a new entity-specific sampling module for the new DOF group.

8. The method of claim 1, wherein the ordering of the plurality of nonfunctional DOF groups is a partial ordering representing two or more entities being moved simultaneously.

9. A system comprising:
one or more computers and one or more storage devices storing instructions that are operable, when executed by the one or more computers, to cause the one or more computers to perform operations comprising:
receiving a request to generate a motion for a kinematic system having a plurality of connected entities, wherein the request specifies one or more control points in a robotic operating environment;
obtaining data representing a plurality of degree-of-freedom (DOF) groups, each DOF group representing a respective entity of plurality of entities of the kinematic system, wherein the DOF groups comprise a plurality of nonfunctional DOF groups and a functional DOF group;
identifying an entity-specific sampling module for each DOF group, wherein each entity-specific sampling module is configured to use a Cartesian kinematic view for the DOF group, a DOF kinematic view for the DOF group, or both, to generate joint configuration samples;
obtaining an ordering of the plurality of nonfunctional DOF groups;
generating, by a respective entity-specific sampling module for each nonfunctional DOF group of the plurality of nonfunctional DOF groups, a plurality of joint configuration samples according to the ordering of the plurality of nonfunctional DOF groups;
generating, by a respective entity-specific sampling module for the functional DOF group, a final joint configuration sample for one or more of the one or more control points; and
generating a motion comprising a sequence of respective joint configuration samples from each of the plurality of DOF groups.

10. The system of claim 9, wherein generating the plurality of joint configuration samples according to the ordering of the plurality of nonfunctional DOF groups comprises generating joint configuration samples from an initial condition generated by a joint configuration sample generated for a previous nonfunctional DOF group in the ordering.

11. The system of claim 9, wherein generating, by a respective entity-specific sampling module for each nonfunctional DOF group of the plurality of nonfunctional DOF groups, a plurality of joint configuration samples comprises sampling a first DOF group in Cartesian space and sampling a second DOF group in joint space.

12. The system of claim 9, wherein the Cartesian kinematic view for a DOF group is configured to receive a relative pose value representing a relative pose between two reference frames and to perform one or more inverse kinematic processes to generate updated degree-of-freedom values to effectuate the relative pose value.

13. The system of claim 9, wherein the DOF kinematic view for a DOF group is configured to receive an updated DOF value and update state information for a representation of a corresponding entity.

14. The system of claim 9, wherein the operations further comprise:

receiving an update to the kinematic system, wherein the update adds an additional entity having an associated new DOF group;

obtaining a new ordering of the plurality of nonfunctional DOF groups, the new ordering including the new DOF groups; and generating a new motion that incorporates the update to the kinematic system, wherein the new motion includes a new joint configuration sample for the new DOF group.

15. The system of claim 14, wherein the new joint configuration sample is generated by a new entity-specific sampling module for the new DOF group.

16. The system of claim 9, wherein the ordering of the plurality of nonfunctional DOF groups is a partial ordering representing two or more entities being moved simultaneously.

17. One or more non-transitory computer storage media encoded with computer program instructions that when executed by one or more computers cause the one or more computers to perform operations comprising:

receiving a request to generate a motion for a kinematic system having a plurality of connected entities, wherein the request specifies one or more control points in a robotic operating environment;

obtaining data representing a plurality of degree-of-freedom (DOF) groups, each DOF group representing a respective entity of plurality of entities of the kinematic system, wherein the DOF groups comprise a plurality of nonfunctional DOF groups and a functional DOF group;

identifying an entity-specific sampling module for each DOF group, wherein each entity-specific sampling module is configured to use a Cartesian kinematic view for the DOF group, a DOF kinematic view for the DOF group, or both, to generate joint configuration samples;

obtaining an ordering of the plurality of nonfunctional DOF groups;

generating, by a respective entity-specific sampling module for each nonfunctional DOF group of the plurality of nonfunctional DOF groups, a plurality of joint configuration samples according to the ordering of the plurality of nonfunctional DOF groups;

generating, by a respective entity-specific sampling module for the functional DOF group, a final joint configuration sample for one or more of the one or more control points; and generating a motion comprising a sequence of respective joint configuration samples from each of the plurality of DOF groups.

18. The one or more computer storage media of claim 17, wherein generating the plurality of joint configuration samples according to the ordering of the plurality of nonfunctional DOF groups comprises generating joint configuration samples from an initial condition generated by a joint configuration sample generated for a previous nonfunctional DOF group in the ordering.

19. The one or more computer storage media of claim 17, wherein generating, by a respective entity-specific sampling module for each nonfunctional DOF group of the plurality of nonfunctional DOF groups, a plurality of joint configuration samples comprises sampling a first DOF group in Cartesian space and sampling a second DOF group in joint space.

20. The one or more computer storage media of claim 17, wherein the Cartesian kinematic view for a DOF group is configured to receive a relative pose value representing a relative pose between two reference frames and to perform one or more inverse kinematic processes to generate updated degree-of-freedom values to effectuate the relative pose value.

\* \* \* \* \*